United States Patent
Kitamoto

(10) Patent No.: US 10,892,504 B2
(45) Date of Patent: Jan. 12, 2021

(54) POWER SUPPLY DEVICE, APPARATUS, AND CONTROL METHOD

(71) Applicant: HONDA MOTOR CO., LTD., Tokyo (JP)

(72) Inventor: Ryota Kitamoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 256 days.

(21) Appl. No.: 16/312,648

(22) PCT Filed: Jun. 24, 2016

(86) PCT No.: PCT/JP2016/068915
§ 371 (c)(1),
(2) Date: Dec. 21, 2018

(87) PCT Pub. No.: WO2017/221421
PCT Pub. Date: Dec. 28, 2017

(65) Prior Publication Data
US 2019/0173108 A1    Jun. 6, 2019

(51) Int. Cl.
| | | |
|---|---|---|
| *H01M 8/04858* | (2016.01) | |
| *H02M 1/40* | (2007.01) | |
| *H02M 3/158* | (2006.01) | |
| *H01M 8/04119* | (2016.01) | |
| *H01M 8/04492* | (2016.01) | |

(Continued)

(52) U.S. Cl.
CPC ..... *H01M 8/0488* (2013.01); *H01M 8/04126* (2013.01); *H01M 8/04492* (2013.01);
(Continued)

(58) Field of Classification Search
CPC .......... H01M 8/0488; H01M 8/04126; H01M 8/04492; H01M 8/04559; H01M 8/04589;
(Continued)

(56) References Cited

U.S. PATENT DOCUMENTS

| | | |
|---|---|---|
| 6,376,111 B1 | 4/2002 | Mathias et al. |
| 8,143,741 B2 * | 3/2012 | Funakoshi ............... B60L 1/14 307/10.8 |

(Continued)

FOREIGN PATENT DOCUMENTS

| | | |
|---|---|---|
| JP | 2007-012418 A | 1/2007 |
| JP | 2007-195373 A | 8/2007 |

(Continued)

OTHER PUBLICATIONS

Sep. 20, 2016, International Search Report issued for related PCT application No. PCT/JP2016/068915.

(Continued)

*Primary Examiner* — Kyle J Moody
*Assistant Examiner* — Lakaisha Jackson
(74) *Attorney, Agent, or Firm* — Paratus Law Group, PLLC

(57) ABSTRACT

A power supply device includes a power supply, a conversion unit performing voltage conversion on electric power to be supplied from the power supply, and a control unit generating a first control signal for inputting or outputting a target voltage or a target current to and from the conversion unit by a feedback loop, and controlling the conversion unit based on the first control signal and a second control signal for detecting a state of the power supply, generated outside the feedback loop. The control unit sets a specific parameter of the second control signal based on a feedforward term based on the output of the power supply and a feedback term in which the specific parameter included in at least one of electric power output from the power supply and input into the conversion unit and electric power output from the conversion unit, is a feedback component.

15 Claims, 12 Drawing Sheets

(51) Int. Cl.
  *H01M 8/04537* (2016.01)
  *H02M 1/00* (2006.01)
(52) U.S. Cl.
  CPC ... *H01M 8/04559* (2013.01); *H01M 8/04589* (2013.01); *H01M 8/04649* (2013.01); *H02M 1/40* (2013.01); *H02M 3/158* (2013.01); *H02M 2001/0048* (2013.01); *H02M 2001/0054* (2013.01); *H02M 2003/1586* (2013.01)
(58) Field of Classification Search
  CPC .... H01M 8/04649; H02M 1/40; H02M 3/158; H02M 2001/0048; H02M 2001/0054; H02M 2003/1586
  See application file for complete search history.

(56) References Cited

U.S. PATENT DOCUMENTS 8,611,117 B2 * 12/2013 Kim .................. H02J 3/385
                                                        363/95

| 2009/0117427 | A1  |    | 5/2009  | Manabe et al. |
|---|---|---|---|---|
| 2011/0300461 | A1  |    | 12/2011 | Manabe et al. |
| 2013/0279214 | A1 | * | 10/2013 | Takase .................... H02M 7/68 363/37 |
| 2014/0125264 | A1 | * | 5/2014  | Nakamura ................ H02P 6/10 318/400.23 |
| 2016/0226264 | A1 | * | 8/2016  | Xu ............................ H02J 7/00 |
| 2016/0261206 | A1 | * | 9/2016  | Ayai ...................... H02M 7/797 |

FOREIGN PATENT DOCUMENTS

| JP | 2007-250365 A | 9/2007 |
|---|---|---|
| JP | 2009-060759 A | 3/2009 |
| JP | 2010-004607 A | 1/2010 |

OTHER PUBLICATIONS

Sep. 20, 2016, International Search Opinion issued for related PCT application No. PCT/JP2016/068915.

* cited by examiner

POWER SUPPLY DEVICE, APPARATUS, AND CONTROL METHOD

CROSS REFERENCE TO PRIOR APPLICATION

This application is a National Stage Patent Application of PCT International Patent Application No. PCT/JP2016/068915 (filed on Jun. 24, 2016) under 35 U.S.C. § 371, which is hereby incorporated by reference in its entirety.

TECHNICAL FIELD

The present invention relates to a power supply device, apparatus, and a control method.

BACKGROUND ART

Patent Document 1 discloses a method of reducing an AC component (hereinafter, also referred to as a superimposed AC component) superimposed on an input current such that an output voltage becomes a measurement lower limit of a measuring device, that is, reducing an AC amplitude to measure electrochemical spectral characteristics of a fuel cell based on a minimum necessary amount of current perturbation. When measuring impedance of the fuel cell, the measured values of a current measuring device and a voltage measuring device are used. However, current-voltage (I-V) characteristics of the fuel cell include a point (inflection point) that changes nonlinearly, and accurate measurement in the vicinity of the point is extremely difficult. Therefore, in the method described in Patent Document 1, the AC amplitude which is the superimposed AC component of an output waveform of the fuel cell is fed back, and the amplitude of the superimposed AC component given to an electronic load device is made small in the vicinity of the inflection point that changes nonlinearly, thereby measuring the impedance while suppressing the influence on the measurement result due to the nonlinear change.

PRIOR ART DOCUMENT

Patent Document

Patent Document 1: JP-A-2007-250365
Patent Document 2: JP-A-2007-012418
Patent Document 3: U.S. Pat. No. 6,376,111

SUMMARY OF THE INVENTION

Problem that the Invention is to Solve

According to the method described in Patent Document 1, at the point where the current-voltage characteristics of the fuel cell nonlinearly change, the superimposed AC component of the input current is reduced, and thus, the measurement accuracy of the impedance of the fuel cell is improved. However, since the superimposed AC component is fed back, when the AC component superimposed in a region where the current-voltage characteristics are regarded linear has a high frequency, fluctuation of an output current of the fuel cell which is a feedback component becomes large. In order to follow the fluctuation, it is necessary to increase a gain in a feedback loop, and there is a possibility that the control stability of the electronic load device deteriorates. In addition, unless a control cycle in the feedback loop is made sufficiently shorter than the cycle that corresponds to the frequency of the superimposed AC component, the superimposed AC component is not recognized at the time of measurement. Therefore, when superimposing the AC component having a high frequency, it is necessary to make the control cycle in the feedback loop ultrafast, and thus, a calculation load for controlling the electronic load device becomes enormous and the control stability deteriorates.

An object of the present invention is to provide a power supply device, apparatus, and a control method capable of detecting a state of a power supply while maintaining the control stability with respect to a conversion unit that performs voltage conversion on electric power to be supplied from the power supply.

Means for Solving the Problem

The present invention is to provide the following aspects.
A first aspect defines a power supply device including:
a power supply (e.g., a fuel cell 101 in embodiment);
a conversion unit (e.g., an FC-VCU 103 in embodiment) configured to perform voltage conversion on electric power to be supplied from the power supply; and
a control unit (e.g., an ECU 113 in embodiment) configured to generate a first control signal for inputting or outputting a target voltage or a target current to and from the conversion unit by a feedback loop, and configured to control the conversion unit based on the first control signal and a second control signal for detecting a state of the power supply, generated outside the feedback loop, wherein
the control unit is configured to set a specific parameter (e.g., an amplitude value of a current in embodiment) of the second control signal based on a feedforward term based on the output (e.g., an input current IFC in embodiment) of the power supply and a feedback term in which the specific parameter included in at least one of electric power output from the power supply to be input into the conversion unit and electric power output from the conversion unit is a feedback component.

A second aspect defines, based on the first aspect, the power supply device, wherein
the control unit superimposes the second control signal on the first control signal outside the feedback loop, and outputs a signal based on the first control signal on which the second control signal is superimposed to the conversion unit.

A third aspect defines, based on the first or second aspect, the power supply device, wherein
the feedforward term has a larger influence on the specific parameter of the second control signal than the feedback term.

A fourth aspect defines, based on the first to third aspects, the power supply device, wherein
the control unit modifies the specific parameter derived from the feedforward term according to the specific parameter derived from the feedback term, and generates the second control signal.

A fifth aspect defines, based on the first to fourth aspects, the power supply device, wherein
the control unit executes a feedback control in a control cycle slower than the feedback control for generating the first control signal.

A sixth aspect defines, based on the first to fifth aspects, the power supply device, wherein
the control unit corrects the influence on the specific parameter of the second control signal by the feedback term, based on at least one of a current input into the conversion unit and a current output from the conversion unit.

A seventh aspect defines, based on the sixth aspect, the power supply device, wherein the control unit reduces the influence on the specific parameter of the second control signal by the feedback term, when at least one of the current input into the conversion unit and the current output from the conversion unit is included in a predetermined range.

An eighth aspect defines, based on the first to seventh aspects, the power supply device, wherein the specific parameter includes an amplitude value of at least one of the current input into the conversion unit and the current output from the conversion unit.

A ninth aspect defines, based on the first to eighth aspects, the power supply device, wherein the control unit measures impedance of the power supply based on the output of the power supply generated by the second control signal.

A tenth aspect defines, based on the ninth aspect, the power supply device, wherein the power supply is a fuel cell, and the control unit adjusts a humidifying amount in the fuel cell based on the impedance.

An eleventh aspect defines a power supply device including:

a power supply (e.g., a fuel cell 101 in embodiment);

a conversion unit (e.g., an FC-VCU 103 in embodiment) formed by electrically connecting a plurality of conversion units in parallel, the plurality of conversion units configured to perform voltage conversion on electric power to be supplied from the power supply;

a change unit (e.g., an ECU 113 in embodiment) configured to change the number of operations which is the number of the conversion units performing the voltage conversion; and a control unit (e.g., the ECU 113 in embodiment) configured to generate a first control signal for inputting or outputting a target voltage or a target current to and from the conversion unit by a feedback loop, and configured to control the conversion unit based on the first control signal and a second control signal for detecting a state of the power supply, generated outside the feedback loop, wherein the control unit is configured to set a specific parameter (e.g., an amplitude value of a current in embodiment) of the second control signal based on a feedforward term based on at least one of the number of operations and a current output from the power supply to be input into the conversion unit and a feedback term in which the specific parameter included in at least one of electric power output from the power supply to be input into the conversion unit and electric power output from the conversion unit is a feedback component.

A twelfth aspect defines an apparatus including the power supply device according to any of the first to eleventh aspects.

A thirteenth aspect defines a control method performed by a power supply device, the power supply device including a power supply (e.g., a fuel cell 101 in embodiment), a conversion unit (e.g., an FC-VCU 103 in embodiment) configured to perform voltage conversion on electric power to be supplied from the power supply; and a control unit (e.g., an ECU 113 in embodiment) configured to generate a first control signal for inputting or outputting a target voltage or a target current to and from the conversion unit by a feedback loop, and configured to control the conversion unit based on the first control signal and a second control signal for detecting a state of the power supply, generated outside the feedback loop, the control method including setting a specific parameter (e.g., an amplitude value of a current in embodiment) of the second control signal, by the control unit, based on a feedforward term based on the output (e.g., an input current IFC in embodiment) of the power supply and a feedback term in which the specific parameter included in at least one of electric power output from the power supply to be input into the conversion unit and electric power output from the conversion unit is a feedback component.

A fourteenth aspect defines a control method performed by a power supply device, the power supply device including a power supply (e.g., a fuel cell 101 in embodiment), a conversion unit (e.g., an FC-VCU 103 in embodiment) formed by electrically connecting a plurality of conversion units in parallel, the plurality of conversion units configured to perform voltage conversion on electric power to be supplied from the power supply, a change unit (e.g., an ECU 113 in embodiment) configured to change the number of operations which is the number of the conversion units performing the voltage conversion, and a control unit (e.g., the ECU 113 in embodiment) configured to generate a first control signal for inputting or outputting a target voltage or a target current to and from the conversion unit by a feedback loop, and configured to control the conversion unit based on the first control signal and a second control signal for detecting a state of the power supply, generated outside the feedback loop, the control method including setting a specific parameter (e.g., an amplitude value of a current in embodiment) of the second control signal, by the control unit, based on a feedforward term based on at least one of the number of operations and a current output from the power supply to be input into the conversion unit and a feedback term in which the specific parameter included in at least one of electric power output from the power supply to be input into the conversion unit and electric power output from the conversion unit is a feedback component.

Advantages of the Invention

In the first, twelfth, and thirteenth aspects, the specific parameter of the second control signal for detecting the state of the power supply is set based on the feedforward term and the feedback term. Therefore, the specific parameter of the second control signal is not uniformly fixed to the value determined by the feedforward term based on the output of the power supply, and the modification by the feedback term corresponding to the individual error and the like of the conversion unit is reflected. In other words, the specific parameter of the second control signal is set not only by the feedforward control but also by the feedback control. As a result, since the specific parameter of the second control signal is set in consideration of an individual error or the like of the conversion unit, at least one waveform of the electric power output from the power supply to be input into the conversion unit and the electric power output from the conversion unit is stabilized, and the control stability with respect to the conversion unit is improved. In addition, the second control signal is generated outside the feedback loop that generates the first control signal. Accordingly, since the generation of the second control signal does not influence the speedup of the feedback loop generating the first control signal, the state of the power supply can be detected while maintaining the control stability with respect to the conversion unit.

According to the second aspect, since the second control signal is superimposed on the first control signal outside the feedback loop that generates the first control signal, even when the second control signal has a high frequency, it is possible to maintain the control stability with respect to the conversion unit. In addition, since the conversion unit is driven by the signal based on the first control signal on which the second control signal is superimposed, both the voltage conversion and the state detection on the power supply are possible.

According to the third aspect, since the feedforward term has much influence on the second control signal, most of the specific parameters of the second control signal are determined by the feedforward term, and the feedback term merely functions as a correction amount of the feedforward term, it is possible to prevent deterioration in stability of the second control signal by the feedback term.

According to the fourth aspect, since the specific parameter of the second control signal derived from the feedforward term is modified by the feedback term based on the input and output electric power of the conversion unit, it is possible to set the specific parameter of the second control signal which cannot be optimally set only by the feedforward term as an appropriate value that corresponds to the input and output electric power of the conversion unit.

According to the fifth aspect, since the control cycle of the first control signal for outputting a target voltage or a target current to the conversion unit and the control cycle of the second control signal for detecting the state of the power supply are different from each other, the controls do not interfere with the each other. In addition, since it is sufficient to be lower than the followability required for the first control signal for outputting the target voltage or the target current with respect to the conversion unit, the second control signal is preferably set to be relatively slow such that the state of the power supply can be accurately detected. Accordingly, it is possible to generate the first control signal and the second control signal having different roles without interference within an appropriate control cycle in consideration of the mutual roles.

According to the sixth aspect, since the feedback term is based on the input and output current of the conversion unit which directly influences the control stability, the feedback term directly contributes to maintaining the control stability with respect to the conversion unit.

According to the seventh aspect, the influence on the specific parameter of the second control signal by the feedback term becomes appropriate based on the current input to and output from the conversion unit, and the second control signal becomes more stable.

According to the eighth aspect, since the amplitude value of the current indicating the second control signal is set, it is possible to effectively avoid the zero crossing or the discontinuous mode of the output current of the power supply which causes unstable control.

According to the ninth aspect, the impedance of the power supply can be measured with high accuracy while maintaining the control stability with respect to the conversion unit.

According to the tenth aspect, it is possible to adjust the humidifying amount in the fuel cell with high accuracy while maintaining the control stability with respect to the conversion unit, thereby increasing the life of the fuel cell.

In the eleventh, twelfth, and fourteenth aspects, the specific parameter of the second control signal for detecting the state of the power supply is set based on the feedforward term and the feedback term. Therefore, the specific parameter of the second control signal is not fixed to the value determined by the feedforward term based on the number of operations of the conversion unit, and the modification by the feedback term corresponding to the individual error of the conversion unit, the change in the parameter, or the like is reflected. In other words, the specific parameter of the second control signal is set not only by the feedforward control but also by the feedback control. As a result, the control stability with respect to the conversion unit including the plurality of conversion units is improved. In addition, the second control signal is generated outside the feedback loop that generates the first control signal. Therefore, since the generation of the second control signal does not influence the speedup of the feedback loop that generates the first control signal, the state of the power supply can be detected while maintaining the control stability with respect to the conversion unit including the plurality of conversion units.

MODES FOR CARRYING OUT THE INVENTION

Hereinafter, embodiments of the present invention will be described with reference to the drawings.

Figure 1:
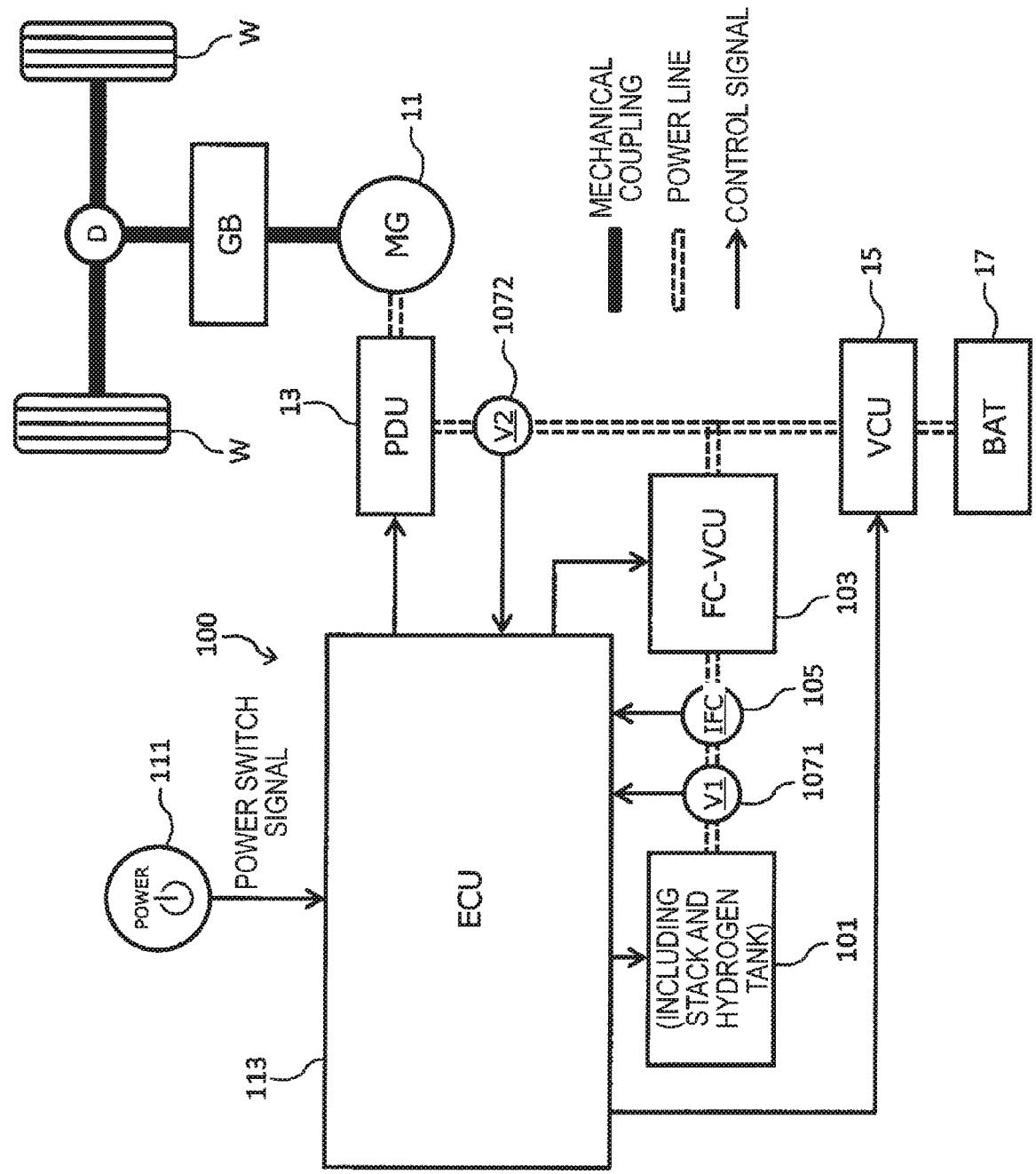
FIG. 1 is a block diagram illustrating a schematic configuration of an electric vehicle in which a power supply device according to one embodiment of the present invention is mounted.

FIG. 1 is a block diagram illustrating a schematic configuration of an electric vehicle in which a power supply device according to one embodiment of the present invention is mounted. The thick solid lines in FIG. 1 indicate mechanical couplings, the double dotted lines indicate power lines, and the thin solid line arrows indicate control signals. An one-MOT type electric vehicle illustrated in FIG. 1 includes a motor generator (MG) 11, a power drive unit (PDU) 13, a voltage control unit (VCU) 15, a battery 17, and a power supply device 100 according to the embodiment. Hereinafter, each configuration element of the electric vehicle will be described below.

The motor generator 11 is driven by electric power supplied from at least one of the battery 17 and the power supply device 100, and generates the electric power for the electric vehicle to travel. A torque generated by the motor generator 11 is transmitted to a driving wheel W via a gear box GB including a shift gear stage or a fixed gear stage, and a differential gear D. Further, the motor generator 11 operates as a generator when decelerating the electric vehicle and outputs a braking force of the electric vehicle. In addition, regenerative electric power generated by operating the motor generator 11 as a generator is stored in the battery 17.

The PDU 13 converts a DC voltage into a three-phase AC voltage and applies the three-phase AC voltage to the motor generator 11. Further, the PDU 13 converts the AC voltage input during a regeneration operation of the motor generator 11 into the DC voltage.

The VCU 15 boosts an output voltage of the battery 17 while a direct current is maintained. In addition, the VCU 15 steps down the electric power generated by the motor generator 11 and converted into the direct current during the deceleration of the electric vehicle. Furthermore, the VCU 15 steps down the output voltage of the power supply device 100 while the direct current is maintained. The electric power stepped down by the VCU 15 is charged in the battery 17.

The battery 17 includes a plurality of storage cells, such as a lithium ion battery, a nickel hydrogen battery, and the like, and supplies electric power having a high voltage to the motor generator 11 via the VCU 15. In addition, the battery 17 is not limited to a secondary battery, such as a lithium ion battery or a nickel hydrogen battery. For example, a capacitor capable of charging and discharging a large amount of electric power in a short period of time may be used as the battery 17 although the storageable capacity thereof is small, may be used as the battery 17.

As illustrated in FIG. 1, the power supply device 100 includes a fuel cell (FC) 101, an fuel cell voltage control unit (FC-VCU) 103, a current sensor 105, phase current sensors 1051 to 1054 (refer to FIG. 2), voltage sensors 1071 and 1072, temperature sensors 1091 to 1094 (refer to FIG. 2), a power switch 111, and an electronic control unit (ECU) 113.

The fuel cell 101 includes a hydrogen tank, a hydrogen pump, and an FC stack. The hydrogen tank stores hydrogen which is a fuel for the electric vehicle to travel. The hydrogen pump adjusts an amount of hydrogen sent from the hydrogen tank to the FC stack. In addition, the hydrogen pump can also adjust the humidifying amount of hydrogen by supplying the dry hydrogen stored in the hydrogen tank to the FC stack via a reservoir in the hydrogen pump. The FC stack takes in hydrogen supplied from the hydrogen pump and oxygen in the air, and generates electric energy by a chemical reaction. The electric energy generated by the FC stack is supplied to the motor generator 11 or the battery 17.

In the fuel cell 101, in addition to a solid polymer electrolyte fuel cell (PEFC), various types of fuel cells, such as a phosphoric acid fuel cell (PAFC), a molten carbonate fuel cell (MCFC), or a solid oxide fuel cell (SOFC), can be employed.

In addition, a closed circuit voltage of the fuel cell 101 fluctuates according to a discharge amount. Further, the characteristics of the fuel cell 101 and the characteristics of the above-described battery 17 are different from each other. The fuel cell 101 can continuously discharge a large current as long as hydrogen and oxygen which are fuel are supplied. However, it is difficult to make the output of the fuel cell 101 discontinuously fluctuate in a short period of time in principle to generate electricity by an electrochemical reaction of a fuel gas to be supplied. When considering the characteristics, it can be said that the fuel cell 101 has characteristics as a high-capacity power supply. In principle to generate the electricity by the electrochemical reaction of an active material on the inside, it is difficult for one battery 17 to continuously discharge a large current, but it is definitely not difficult to make the output discontinuously fluctuate in a short period of time. When considering the characteristics, it can be said that the battery 17 has characteristics as a high-power type power supply.

Figure 2:
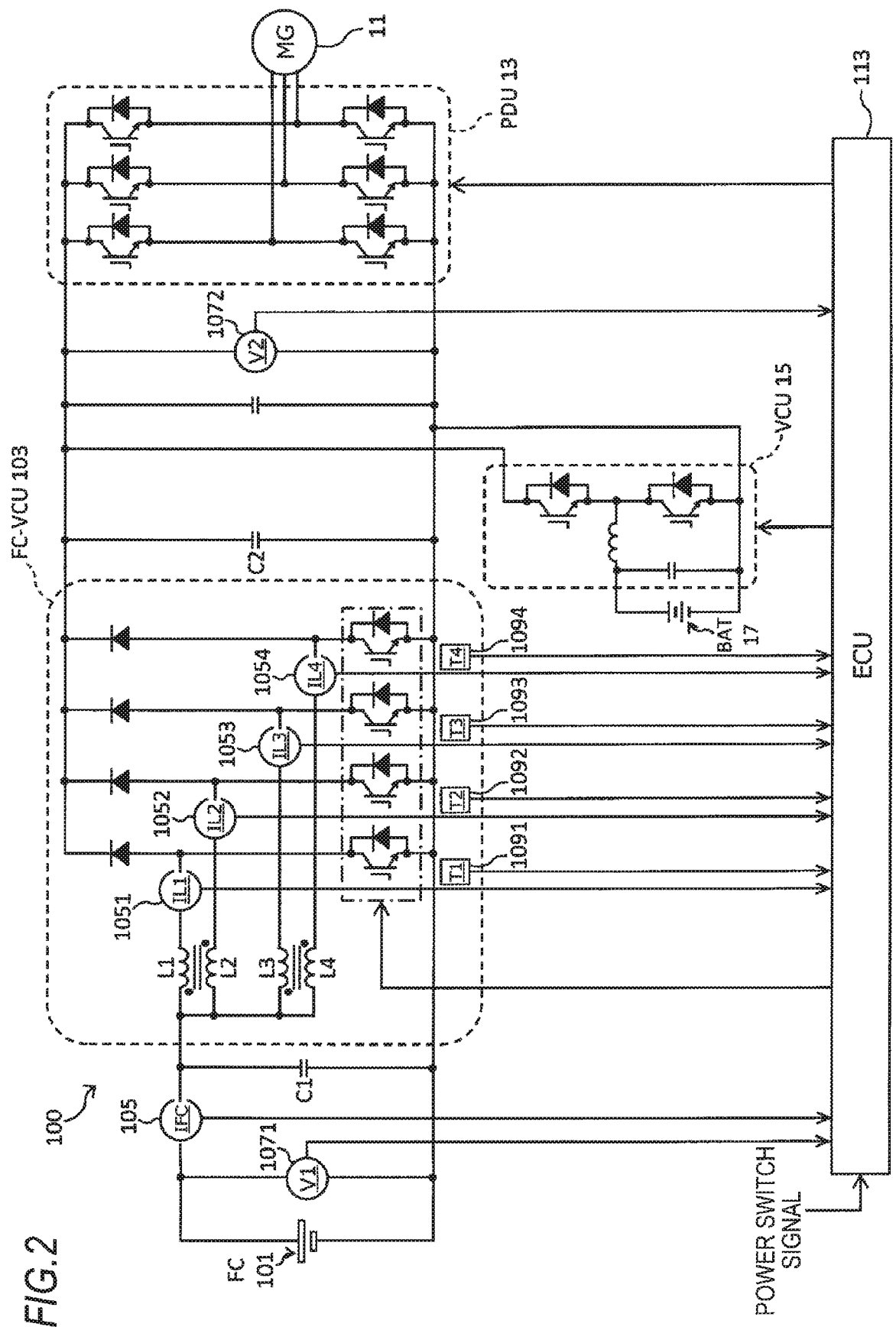
FIG. 2 is an electric circuit diagram illustrating a relationship of the power supply device, a battery, a VCU, a PDU, and a motor generator according to the embodiment.

The FC-VCU 103 is a so-called multiphase converter which includes four conversion units capable of converting the voltage of the electric power (electric energy) output from the fuel cell 101, connects the conversion units to each other in parallel, and commonly uses an output node and an input node. FIG. 2 is an electric circuit diagram illustrating a relationship of the power supply device 100, the battery 17, the VCU 15, the PDU 13, and the motor generator 11. As illustrated in FIG. 2, each conversion unit of the FC-VCU 103 has a circuit configuration of a boosting chopper circuit including a reactor, a diode connected to the reactor in series, and a switching element connected between the reactor and the diode. In addition, a smoothing capacitor C1 is provided in parallel with the four conversion units on the input side of the FC-VCU 103, and a smoothing capacitor C2 is provided in parallel with the VCU 15 on the output side of the FC-VCU 103.

The four conversion units of the FC-VCU 103 are electrically connected to each other in parallel, and by performing an ON and OFF switching operation with respect to a switching element of at least one conversion unit at a desired timing, the voltage of the fuel cell 101 is boosted and output while the direct current is maintained. The ON and OFF switching operation of the switching element of the conversion unit is controlled by a switching signal having a pulse-like predetermined duty ratio from the ECU 113 to the FC-VCU 103.

Figure 3:
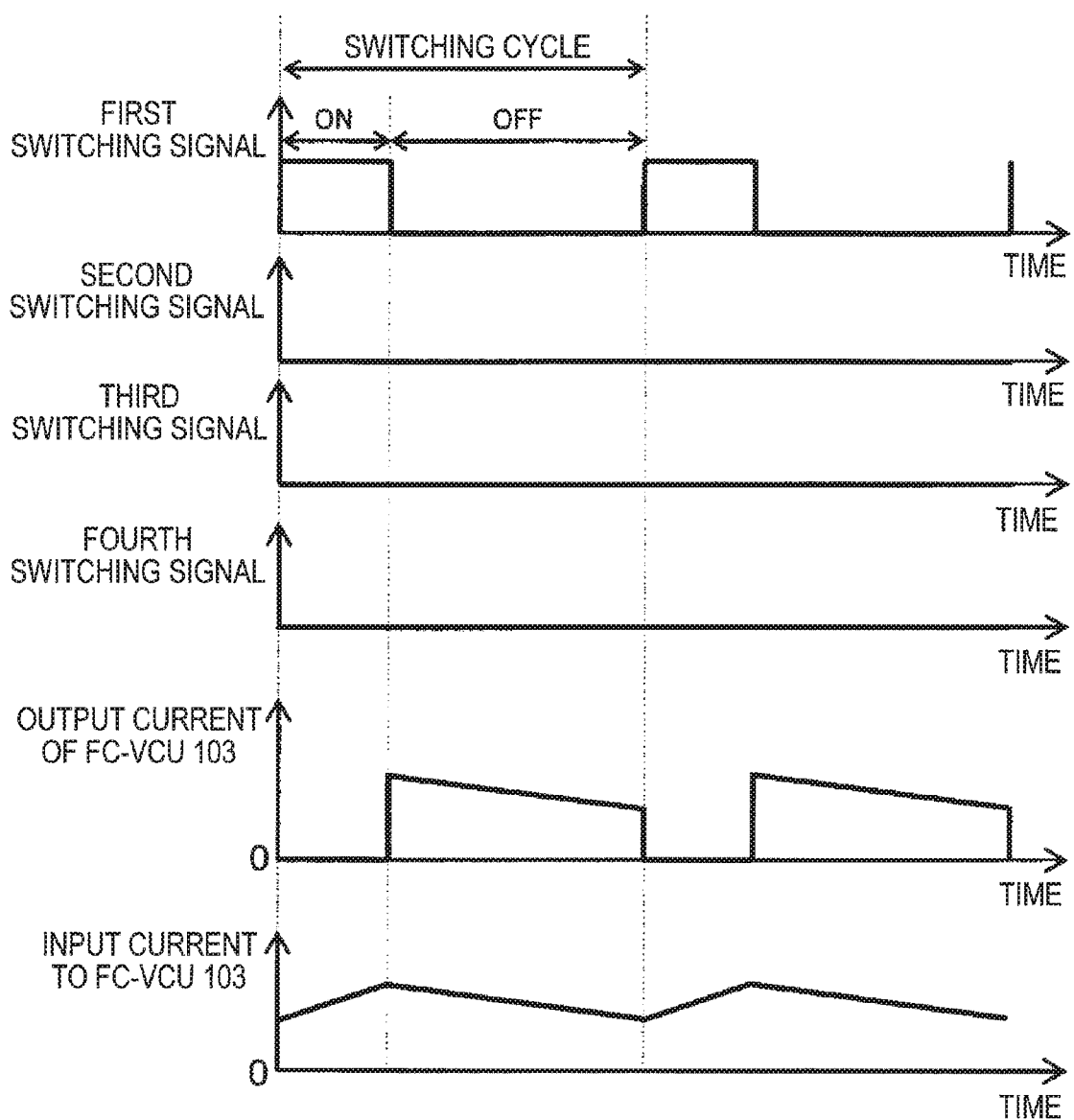
FIG. 3 is a view illustrating a change with time in a switching signal and an input and output current of an FC-VCU when only one of four conversion units (phases) of the FC-VCU is driven.
Figure 4:
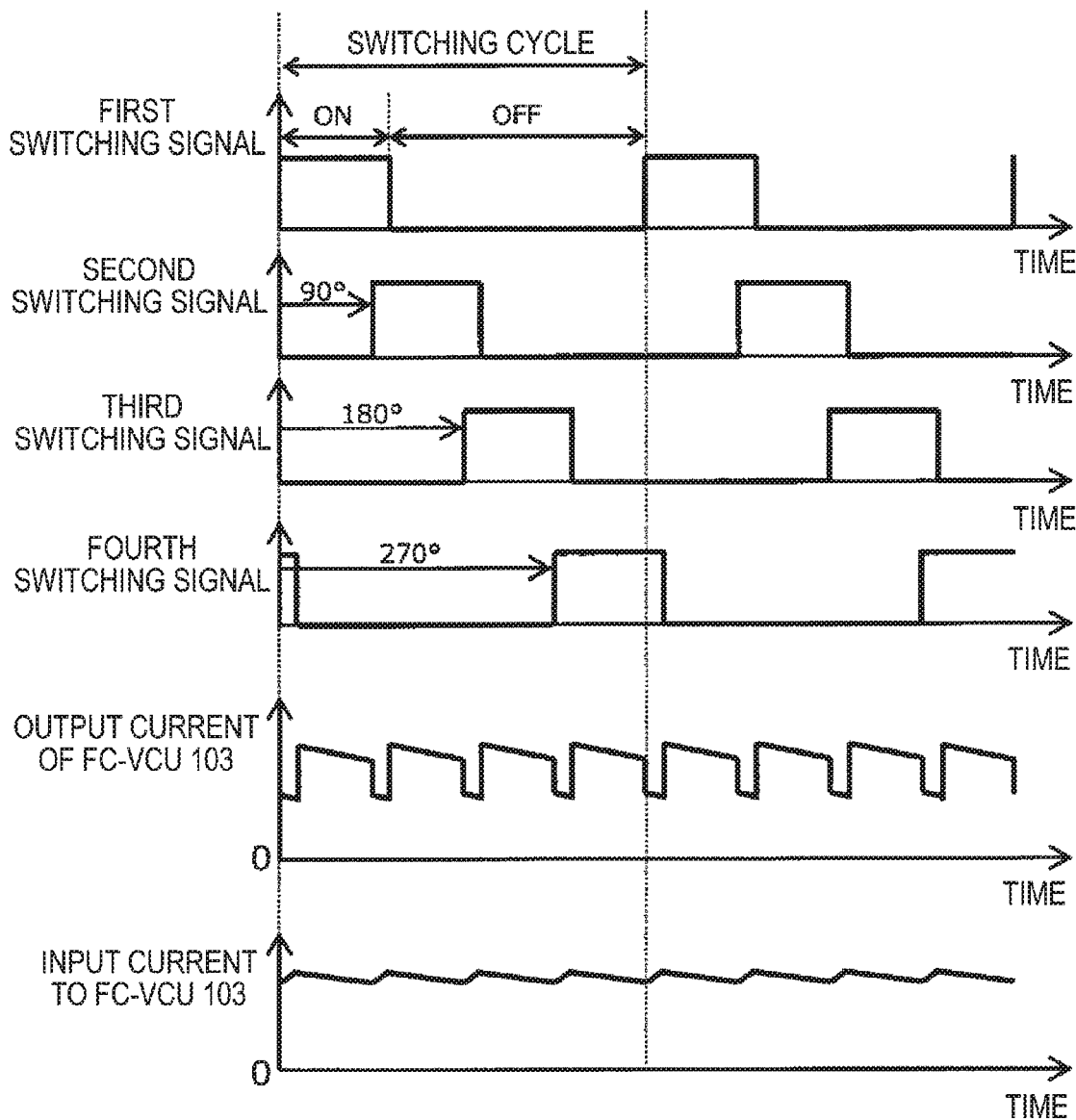
FIG. 4 is a view illustrating a change with time in the switching signal and the input and output current of the FC-VCU when all of four conversion units (phases) of the FC-VCU are driven.

The number of conversion units to be driven under the control of the ECU 113 influences the ripple of the output current of the FC-VCU 103. When the switching element of the conversion unit is controlled to be switched ON and OFF, the input current to the FC-VCU 103 flows to the switching element side during the ON operation and the reactor stores energy, and the input current to the FC-VCU 103 flows to the diode side during the OFF operation and the reactor discharges the stored energy. Therefore, when only one of the four conversion units of the FC-VCU 103 is driven, as illustrated in FIG. 3, the current that has flowed through the conversion unit during the OFF operation is output from the FC-VCU 103. In addition, when all the four conversion units of the FC-VCU 103 are driven, as illustrated in FIG. 4, an interleave control is performed to shift the ON and OFF switching phase of each conversion unit by 90 degrees. In this case, the ripple of the output current of the FC-VCU 103 is smaller compared to that of a case where only one conversion unit illustrated in FIG. 3 is driven by synthesizing the output current of each conversion unit at the output node of the FC-VCU 103. In addition, when two of the four conversion units of the FC-VCU 103 are driven, the interleave control is performed to shift the ON and OFF switching phase of each conversion unit to be driven by 180 degrees. The ripple of the output current of the FC-VCU 103 at this time is greater compared to the case of driving the four conversion units illustrated in FIG. 4, but the ripple is smaller compared to the case of driving only one conversion unit illustrated in FIG. 3. In this manner, the ripple of the output current changes according to the number of conversion units to be driven. The ripple of the output current can be minimized by setting the phase difference between the conversion units to be driven to be equal to a value divided by the number of conversion units to be driven by 360 degrees.

In addition, the number of conversion units to be driven also influences loss generated in the FC-VCU 103. The loss generated in the FC-VCU 103 includes three losses including a transition loss $\eta$trans generated when the switching element transits between the ON and OFF states, a conduction loss $\eta$conduct generated from a resistance component of the switching element and the like, and a switching loss $\eta$switch (Fsw) generated by the switching.

A loss $\eta$total_1 generated in the FC-VCU 103 when only one of the four conversion units is driven is expressed by the following Equation (1). However, "IFC" is the input current to the FC-VCU 103, "V1" is the input voltage of the FC-VCU 103, and "V2" is the output voltage of the FC-VCU 103. In addition, "Ttrans" is a transition time from ON to OFF or from OFF to ON in the switching element, "Fsw" is a switching frequency, and "RDSon" is an ON resistance of the switching element that configures the conversion unit. Further, "A" is a constant.

[Equation 1]

$$\eta\,\text{total\_1} = \eta trans + \eta\,\text{conduct} + \eta\,\text{switch} \quad (1)$$
$$= 2 \cdot V2 \cdot IFC \cdot Ttrans \cdot Fsw + A \cdot RDSon \cdot$$
$$\left(1 - \frac{V1}{V2}\right) \cdot IFC^2 + \eta\,\text{switch}(Fsw)$$

Based on the loss $\eta$total_1 illustrated in Equation (1), the conduction loss increases particularly as the input current IFC to the FC-VCU 103 increases, and a heat generation amount of the FC-VCU 103 increases. Here, when increasing the number of conversion units to be driven and driving N (N is an integer equal to or greater than 2) conversion units, the loss $\eta$total_N generated in the FC-VCU 103 is expressed by the following Equation (2).

[Equation 2]

$$\eta\,\text{total\_1} = N \cdot 2 \cdot V2 \cdot \frac{IFC}{N} \cdot Ttrans \cdot Fsw + N \cdot A \cdot RDSon \cdot \quad (2)$$
$$\left(1 - \frac{V1}{V2}\right) \cdot \left(\frac{IFC}{N}\right)^2 + N \cdot \eta\,\text{switch}(Fsw)$$
$$= 2 \cdot V2 \cdot IFC \cdot Ttrans \cdot Fsw + \frac{1}{N} \cdot A \cdot RDSon \cdot$$
$$\left(1 - \frac{V1}{V2}\right) \cdot IFC^2 N \cdot \eta\,\text{switch}(Fsw)$$

Figure 5:
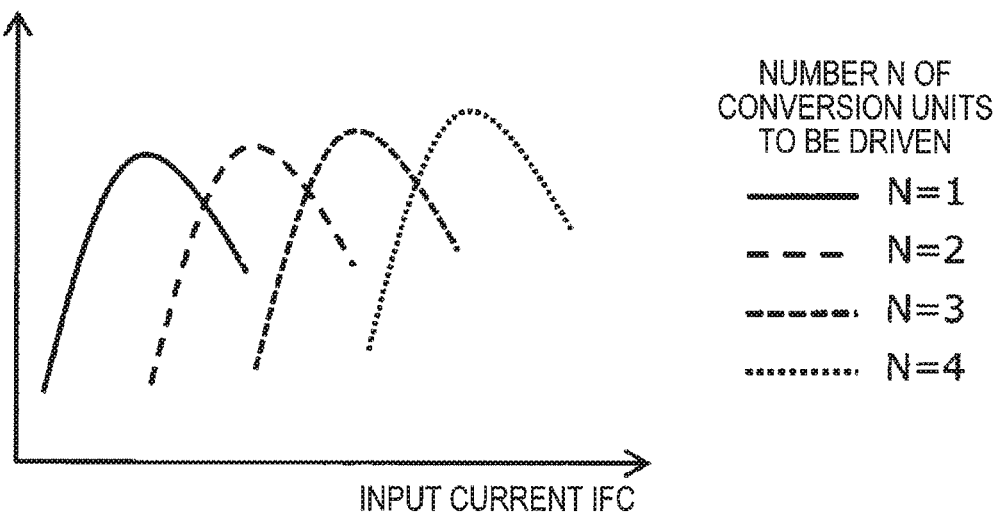
FIG. 5 is a graph illustrating an energy efficiency of the FC-VCU in consideration of loss with respect to the input current per the number N of conversion units (phases) to be driven.

Based on the loss $\eta$total_N illustrated in Equation (2), the switching loss increases with the increase in the number of conversion units to be driven, but the conduction loss decreases. Therefore, the ECU 113 selects the number of conversion units to be driven using a map or the like illustrating the energy efficiency of the FC-VCU 103 in consideration of the loss for each number N of the conversion units to be driven. FIG. 5 is a graph illustrating the energy efficiency of the FC-VCU 103 in consideration of the loss with respect to the input current IFC per the number N of conversion units to be driven. The ECU 113 selects an appropriate number N that corresponds to the input current IFC to the FC-VCU 103 from the map based on the graph of FIG. 5.

Figure 6:
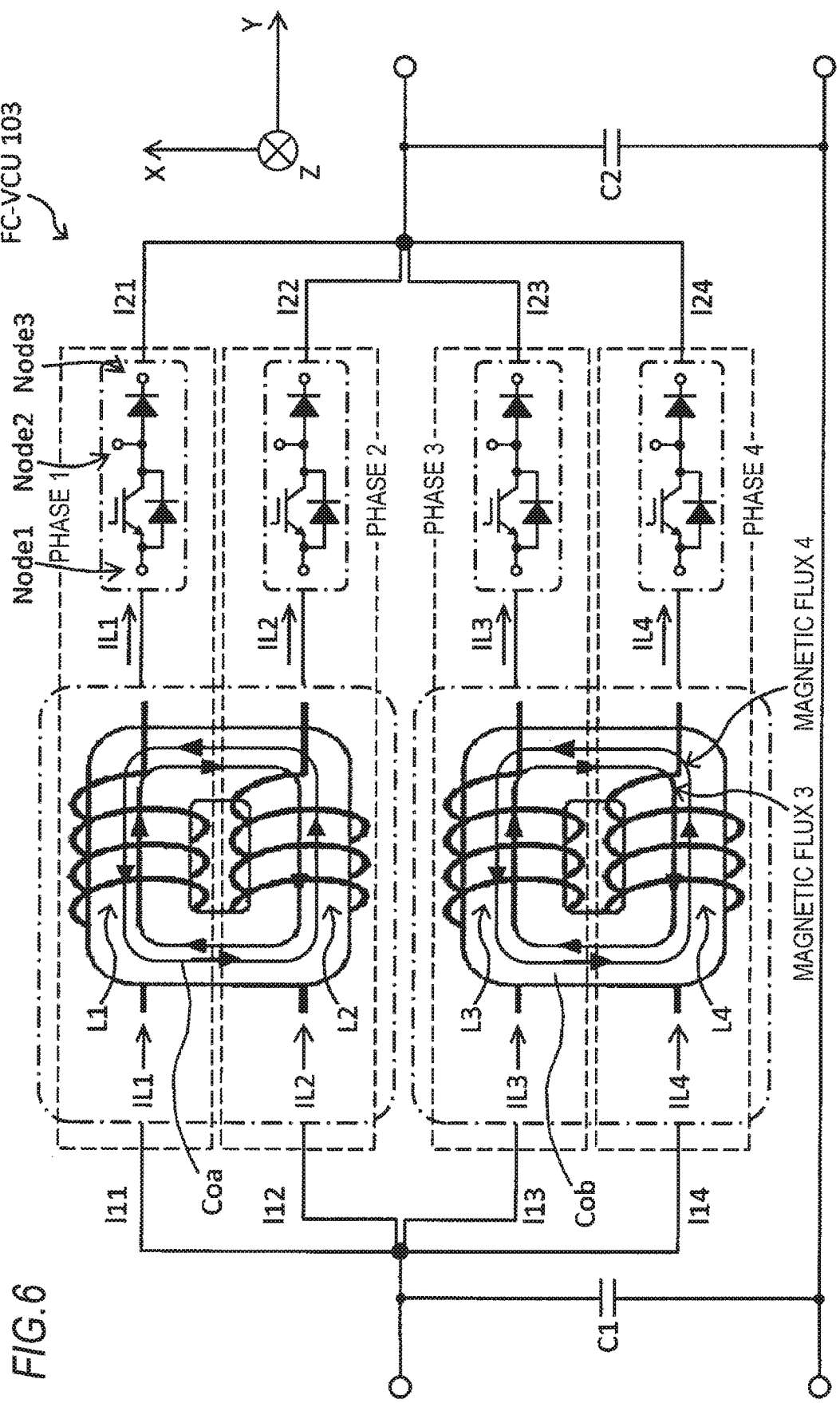
FIG. 6 is a view illustrating a positional relationship of each configuration element of the four conversion units (phases) of the FC-VCU and smoothing capacitors illustrated in FIG. 2 when viewed from a Z-axis direction.

FIG. 6 is a view illustrating a positional relationship of each configuration element of the four conversion units of the FC-VCU 103 illustrated in FIG. 2 and the smoothing capacitors C1 and C2 when viewed from the Z-axis direction. In the following description, each of the four conversion units of the FC-VCU 103 is expressed as "phase". Therefore, in the present embodiment, as illustrated in FIG. 6, the conversion unit including a reactor L1 is referred to as "phase 1", the conversion unit including a reactor L2 as "phase 2", the conversion unit including a reactor L3 as "phase 3", and the conversion unit including a reactor L4 as "phase 4". In addition, as a case where the number (hereinafter, there is also a case of being referred to as "number of operating phases") of the conversion units (phases) to be driven is one is referred to as "one phase", and a case where the number of the conversion units (phases) to be driven is two is referred to as "two phases", the number of operating phases is referred as "N phase" according to the number N of the conversion units (phases) to be driven.

As illustrated in FIG. 6, in the present embodiment, the phases 1 to 4 are disposed to be aligned in one line on an XY plane, the phases 1 and 4 are disposed on the outermost side on the XY plane, the phase 2 is disposed on the inside of the phase 1, and the phase 3 is disposed on the inside of the phase 4. In addition, an iron core of the reactor L1 that configures the phase 1 and an iron core of the reactor L2 that configures the phase 2 are commonly used, and winding directions of the coils of each reactor with respect to the iron core are opposite to each other. Similarly, the iron core of the reactor L3 and the iron core of the reactor L4 are commonly used, and the winding directions of the coils of each reactor with respect to the iron core are opposite to each other. Therefore, the reactor L1 and the reactor L2 are magnetically coupled to each other, and the reactor L3 and the reactor L4 are magnetically coupled to each other.

Furthermore, FIG. 6 illustrates that a magnetic flux generated in each phase is canceled out when the same current has flowed through the reactors magnetically coupled to each other. A current IL3 that flows through the reactor L3 generates a magnetic flux 3 and a current IL4 that flows through reactor L4 generates a magnetic flux 4, by electromagnetic induction respectively. As described above, since the iron core of the reactor L3 and the iron core of the reactor L4 are commonly used, the magnetic flux 3 and the magnetic flux 4 cancel each other out in the directions opposite each other. Therefore, it is possible to prevent magnetic saturation in the reactor L3 and the reactor L4. In addition, the same applies to the reactor L1 and the reactor L2.

In addition, an iron core Coa commonly used by the reactor L1 and the reactor L2 is disposed on the XY plane over the phase 1 and the phase 2, and an iron core Cob commonly used by the reactor L3 and the reactor L4 is disposed on the XY plane over the phase 3 and phase 4. The XY plane may be a horizontal plane or a vertical plane. In addition, the number of reactors to be magnetically coupled is not limited to two. By commonly using the iron core as described above, it is possible to magnetically couple three, four, or more reactors.

Induced currents IL1 to IL4 of the reactors L1 to L4 of each phase are input into a node Node 2 connected to a node that connects one end of the switching element and one end of the diode to each other. A node Node 1 at the other end of the switching element is connected to a ground line. In addition, the output current of each phase is output from a node Node 3 at the other end of the diode.

Figure 7:
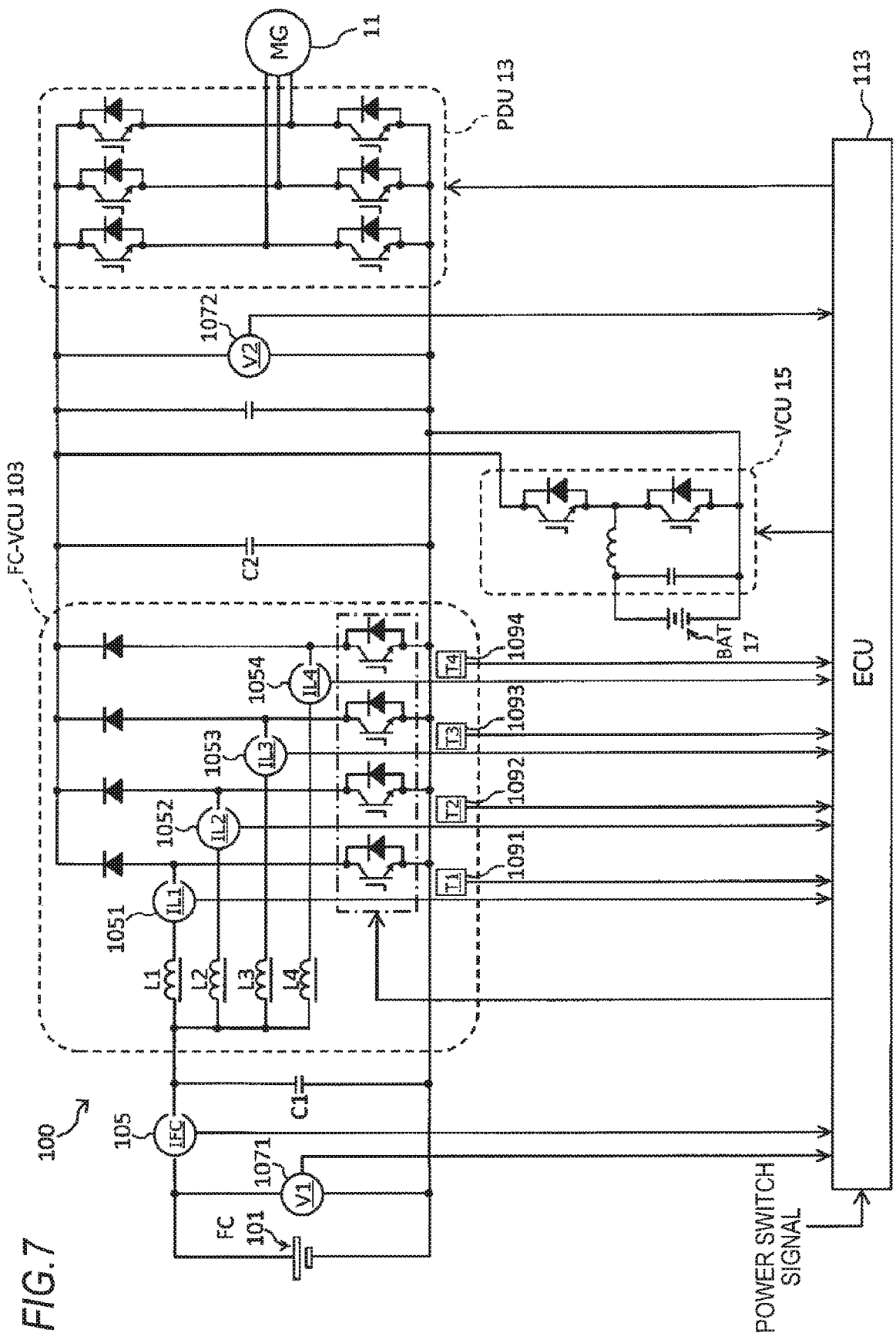
FIG. 7 is an electric circuit diagram illustrating a relationship of a power supply device, a battery, a VCU, a PDU, and a motor generator according to another embodiment.
Figure 8:
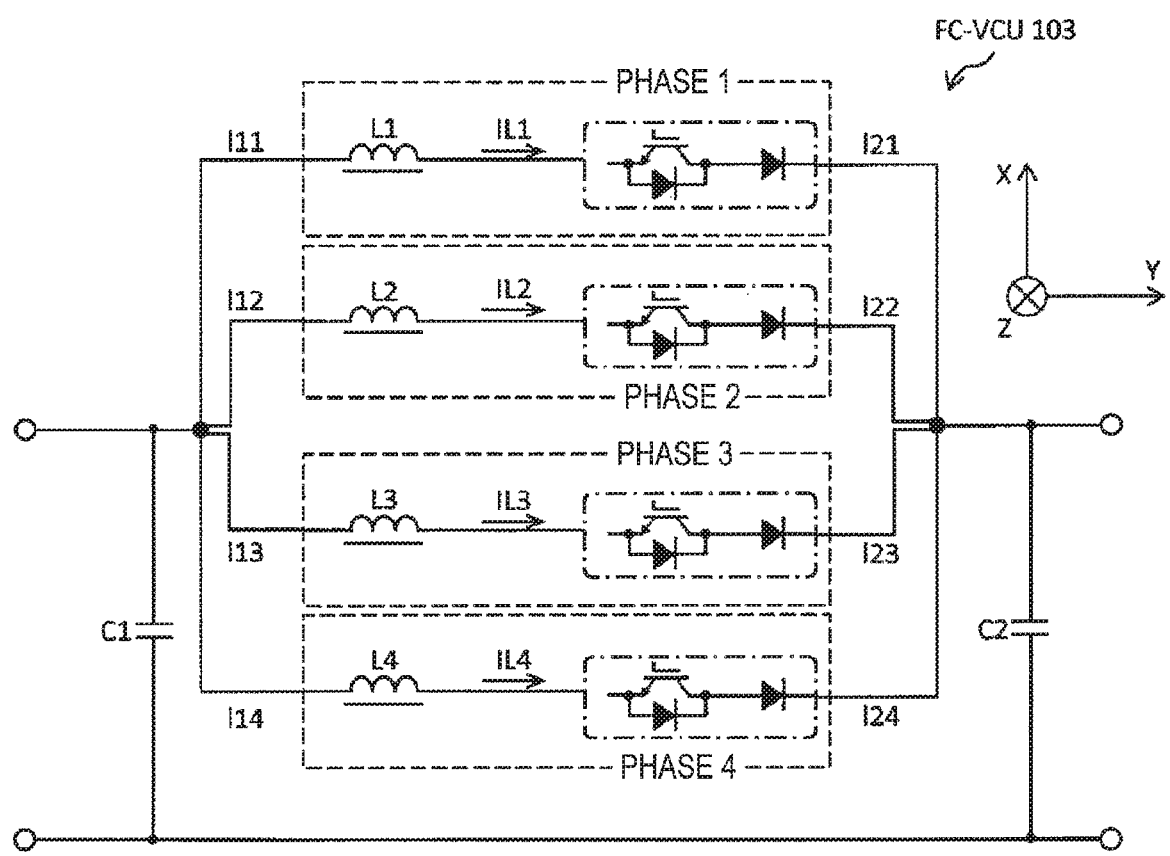
FIG. 8 is a view illustrating a positional relationship of each configuration element of four conversion units (phases) of an FC-VCU and smoothing capacitors illustrated in FIG. 7 when viewed from the Z-axis direction.

In addition, as illustrated in FIG. 7, the iron cores of each reactor that configures the phases 1 to 4 may be independently configured. However, even in this case, as illustrated in FIG. 8, the phases 1 to 4 are disposed to be aligned in one line on an XY plane, the phases 1 and 4 are disposed on the outermost side on the XY plane, the phase 2 is disposed on the inside of the phase 1, and the phase 3 is disposed on the inside of the phase 4.

The current sensor 105 and the phase current sensors 1051 to 1054 included in the power supply device 100 are so-called Hall type current sensors that do not have electrical contacts (nodes) with a circuit that is a current detection target. Each current sensor includes a core and a Hall element, and a magnetic field proportional to the input current generated in a gap of the core is converted into a voltage by the Hall element that is a magnetoelectric conversion element. The current sensor 105 detects the input current IFC to the FC-VCU 103 which is also the output current of the fuel cell 101. A signal indicating a voltage that corresponds to the input current IFC detected by the current sensor 105 is sent to the ECU 113. The phase current sensors 1051 to 1054 illustrated in FIG. 2 detect the phase currents IL1 to IL4 that flows through each phase (each conversion unit) of the FC-VCU 103. A signal indicating the voltage that corresponds to the phase currents IL1 to IL4 detected by the phase current sensors 1051 to 1054 is sent to the ECU 113. In addition, the control cycle of the current sensor 105 and the control cycles of the phase current sensors 1051 to 1054 are different from each other in order to prevent the controls from interfering with each other in the ECU 113. In the present embodiment, the control cycle of the current sensor 105 is faster than the control cycles of the phase current sensors 1051 to 1054. This is because the roles of the current sensor 105 which substantially influences the efficiency of the FC-VCU 103 and changes the number of operating phases by using the detected value, and the auxiliary phase current sensors 1051 to 1054 for balancing the current values of each phase to be driven by using the detected value, are different from each other.

The voltage sensor 1071 detects an input voltage V1 of the FC-VCU 103 which is also the output voltage of the fuel cell 101. A signal indicating the voltage V1 detected by the voltage sensor 1071 is sent to the ECU 113. The voltage sensor 1072 detects an input voltage V2 of the FC-VCU 103. A signal indicating the voltage V2 detected by the voltage sensor 1072 is sent to the ECU 113.

The temperature sensors 1091 to 1094 detect the temperature of the FC-VCU 103, particularly the temperature in the vicinity of the switching elements of each phase (each conversion unit). Signals indicating the temperatures T1 to T4 detected by the temperature sensors 1091 to 1094 are sent to the ECU 113.

The power switch 111 is a switch that is operated by a driver when activating or stopping the electric vehicle in which the power supply device 100 is mounted. When the power switch 111 is operated (turned on) in a state where the electric vehicle is stopped, a power switch signal indicating the activation is input into the ECU 113. Meanwhile, when the power switch 111 is operated (turned off) in a state where the electric vehicle is operated, a power switch signal indicating the stop is input into the ECU 113.

The ECU 113 performs the control of the fuel cell 101, selection of a phase to be driven among the four phases that configure the FC-VCU 103, the ON and OFF switching control by the switching signals to be supplied to the switching element of the selected phase, and the control of the PDU 13 and the VCU 15. Further, the ECU 113 performs a power distribution control using the VCU 15 so as to utilize the characteristics of each of the fuel cell 101 and the battery 17 which have different characteristics. When the electric power distribution control is performed, the fuel cell 101 is used so as to supply constant electric power to the motor generator 11 when the electric vehicle is accelerated, and the battery 17 is used so as to supply the electric power to the motor generator 11 when a large driving force is necessary for making the electric vehicle travel. In addition, when the electric vehicle is decelerating, the ECU 113 charges the battery 17 with the regenerative electric power generated by the motor generator 11.

Furthermore, the ECU 113 performs the following control with respect to the FC-VCU 103. Hereinafter, the control will be described in detail with reference to the drawings.

The ECU 113 superimposes the AC signal on the control signal (hereinafter, simply referred to as "control signal") for performing the ON and OFF switching control with respect to the switching element of the FC-VCU 103 output from the feedback loop, outside the loop (hereinafter, referred to as "feedback loop") of the feedback control in the ECU 113 that controls the FC-VCU 103. Furthermore, the ECU 113 generates a pulse-like switching signal based on the control signal on which the AC signal is superimposed, and outputs the switching signal to each switching element of the FC-VCU 103. In addition, the AC component included in the switching signal is superimposed to measure the impedance of the fuel cell 101. Further, the control cycle of the feedback loop is sufficiently shorter than the cycle that corresponds to the frequency of the AC component.

Figure 9:
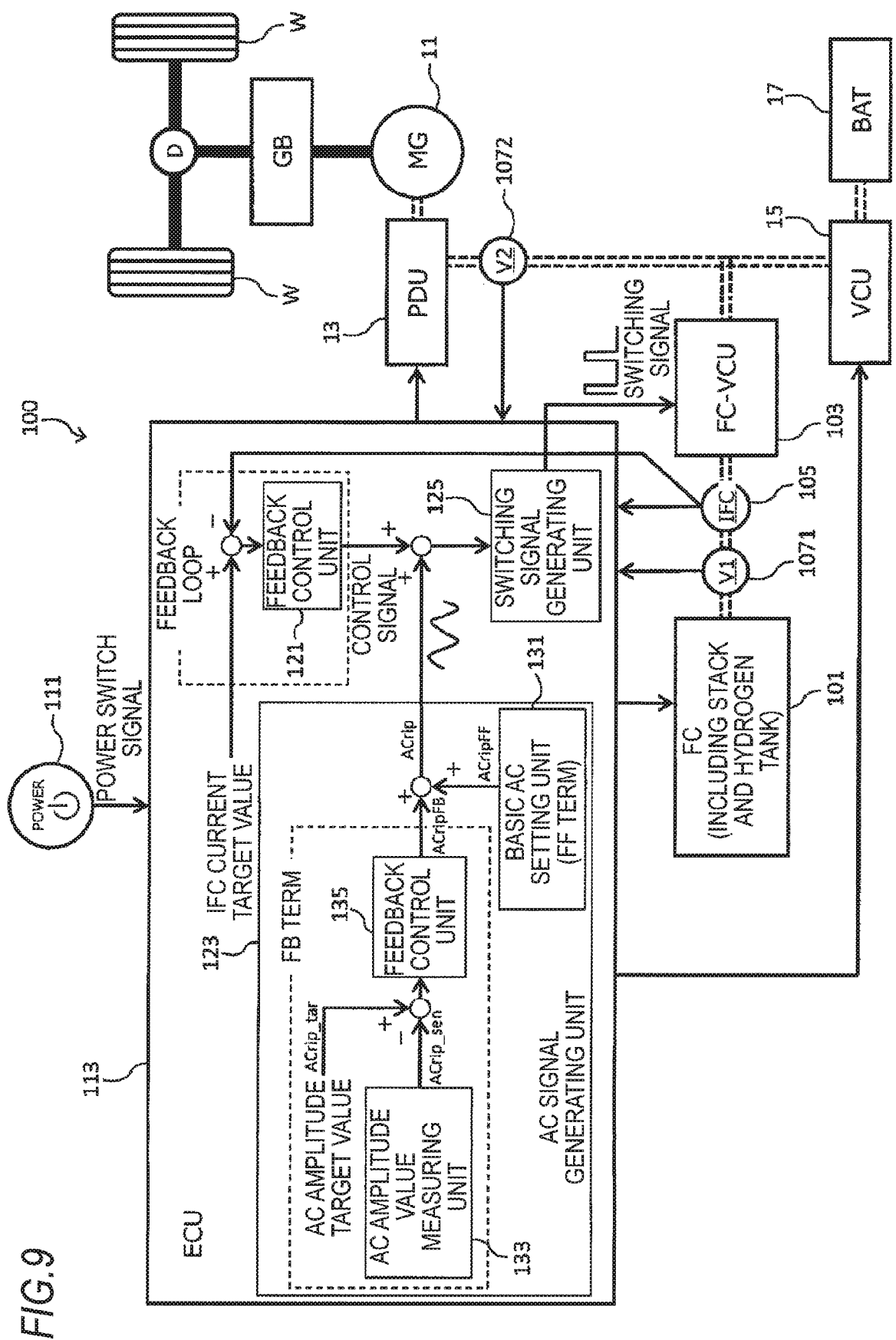
FIG. 9 is a block diagram illustrating a schematic configuration of the electric vehicle in which the power supply device including the ECU is mounted.

FIG. 9 is a block diagram illustrating a schematic configuration of the electric vehicle in which the power supply device 100 including the ECU 113 is mounted. As illustrated in FIG. 9, the ECU 113 includes a feedback loop including a feedback control unit 121, an AC signal generating unit 123 including a feedback control unit 135, and a switching signal generating unit 125. In addition, since the FC-VCU 103 of the present embodiment is controlled in the current control mode, the feedback control unit 121 outputs the target value (hereinafter, referred to as "IFC current target value") of the input current IFC of the FC-VCU 103 to the ECU 113 as an input, so that the feedback loop for feeding back the detected value (input current IFC) of the current sensor 105 is formed.

The feedback control unit 121 outputs the control signal based on the difference between the IFC current target value and the value of the input current IFC detected by the current sensor 105. The AC signal generating unit 123 generates the AC signal superimposed on the control signal so as to measure the impedance of the fuel cell 101. The details of the AC signal generating unit 123 will be described later. The AC signal generated by the AC signal generating unit 123 is superimposed on the control signal output from the feedback control unit 121 outside the feedback loop. The switching signal generating unit 125 generates a pulse-like switching signal based on the control signal on which the AC signal is superimposed, and outputs the switching signal to each switching element of the FC-VCU 103.

Hereinafter, the AC signal generating unit 123 will be described later. As illustrated in FIG. 9, the AC signal generating unit 123 includes a basic AC setting unit 131, an AC amplitude value measuring unit 133, and a feedback control unit 135.

Based on various parameters, such as the state of the fuel cell 101 or the detected value (input current IFC) of the current sensor 105, the basic AC setting unit 131 sets a basic AC signal of an amplitude ACripFF.

The AC amplitude value measuring unit 133 measures an amplitude value ACrip_sen of the AC component included in the input current IFC based on the detected values of the current sensor 105 and the voltage sensor 1071.

The feedback control unit 135 calculates a feedback control amount ACripFB based on a difference (ACrip_tar−ACrip_sen) between an AC amplitude target value ACrip_tar and the amplitude value ACrip_sen of the AC component measured by the AC amplitude value measuring unit 133. In addition, in order to efficiently prevent the current discontinuous mode and the zero crossing, the feedback control amount ACripFB may be modified based on the input current IFC. In addition, similar to the amplitude ACripFF, the AC amplitude target value ACrip_tar is set from various parameters, such as the state of the fuel cell 101 and the detected value (input current IFC) of the current sensor 105, and may be the same as or different from the amplitude ACripFF.

The AC signal generating unit 123 generates an AC signal of the amplitude ACrip obtained by adding the feedback control amount ACripFB which is the calculated value of the feedback term to the amplitude value ACripFF of the basic AC signal which is the calculated value of the feedforward term.

In addition, the control cycle in the feedback loop including the above-described feedback control unit 121 and the control cycle in the stage where the AC signal is superimposed on the control signal outside the feedback loop are different from each other such that the controls do not interfere with each other. In the present embodiment, the control cycle in the stage where the AC signal including the AC signal generating unit 123 is superimposed is slower than the control cycle in the feedback loop. This is because a relatively fast control cycle is required in the feedback loop such that the FC-VCU 103 can output the target voltage in the voltage control mode (to be described later) and the target current in the current control mode (to be described later). Meanwhile, as the control cycle in the stage where the AC signal including the AC signal generating unit 123 is superimposed, the fast control cycle so far is not required, and it is preferable that the control cycle be relatively slow such that the impedance of the fuel cell 101 can be accurately measured. In this manner, since the control cycles of the two feedback loops are different from each other, interference of the controls with each other is prevented. Preferably, each control cycle is set as a different prime number. Furthermore, since the control cycle of the appropriate feedback loop is set in consideration of each role, it is possible to avoid an excessive increase in the calculation load of the ECU 113.

In addition, when controlling the FC-VCU 103 in the voltage control mode for driving the voltage V2 to be the optimal voltage in which the driving efficiency of the motor generator 11 is equal to or higher than a threshold value, the V2 voltage target value is input into the feedback loop including the feedback control unit 121 and the voltage V2 is fed back. Further, when the ECU 113 controls the FC-VCU 103 in the current control mode in which the control of the FC-VCU 103 is stable, the target value of the output current of the FC-VCU 103 is input into the feedback loop including the feedback control unit 121, and the detected value of the output current may be fed back. Even in this case, the AC signal generated by the AC signal generating unit 123 is superimposed on the control signal output from the feedback control unit 121 outside the feedback loop. In addition, in the current control mode, the input current IFC may be controlled instead of the output current of the FC-VCU 103. In addition, in the voltage control mode, the input voltage V1 may be controlled instead of the output voltage V2.

The ECU 113 measures the impedance of the fuel cell 101 by an AC impedance method based on the input current IFC of the FC-VCU 103 which is controlled to be switched ON and OFF according to the switching signal including the AC component and the output voltage of the fuel cell 101 which is also the input voltage V1, and indirectly grasps a moisture content state on the inside of the fuel cell 101. In addition, according to the AC impedance method, the ECU 113 samples each detected value of the current sensor 105 and the voltage sensor 1071 at a predetermined sampling rate, performs Fourier transform processing (FFT operation processing or DFT operation processing), and the like, and then obtains the impedance of the fuel cell 101 by dividing the voltage value after the Fourier transform processing by the current value after the Fourier transform processing. Since the moisture content state on the inside of the fuel cell 101 influences the ion conduction in the electrolyte on the inside the fuel cell 101, the correlation with the impedance of the fuel cell 101 is achieved. Therefore, by measuring the impedance of the fuel cell 101 by the above-described AC impedance method, it is possible to indirectly grasp the moisture content state on the inside of the fuel cell 101. The ECU 113 performs humidification with respect to the fuel cell 101 by an amount that corresponds to the grasped water content state.

As described above, according to the present embodiment, the timing of superimposing the AC component included in the switching signal for performing the ON and OFF switching operation with respect to the switching element of the FC-VCU 103 is outside the feedback loop in the ECU 113. When the AC signal is superimposed in the feedback loop, in particular, when the AC signal has a high frequency, the fluctuation of the input current IFC of the FC-VCU 103, which is the feedback component, becomes large, it is necessary to increase the gain in the feedback loop so as to follow the fluctuation, and there is a possibility that the control stability of the FC-VCU 103 deteriorates.

In addition, in principle, when the control cycle in the feedback loop is made sufficiently faster than the AC signal to be superimposed, the ECU 113 cannot recognize the AC signal, and thus, the AC superimposition is not performed. Therefore, in particular, when the AC signal has a high frequency, the control cycle in the feedback loop becomes ultrafast, and the calculation load of the ECU 113 becomes enormous.

However, since the control cycle outside the feedback loop is slower than the control cycle in the feedback loop, the above-described problem does not occur by superimposing the AC signal outside the feedback as in the present embodiment, and it is possible to measure the impedance of the fuel cell 101 while ensuring the control stability of the FC-VCU 103 and the suppression of the calculation load of the ECU 113. By adjusting the humidifying amount of the fuel gas to be supplied to the fuel cell 101 based on the measured impedance of the fuel cell 101, it is possible to always hold the water content state of the fuel cell 101 in an appropriate state, thereby preventing deterioration of the fuel cell 101 and deterioration in efficiency.

Furthermore, in the present embodiment, the amplitude ACrip of the AC signal superimposed on the control signal for controlling the FC-VCU 103 is set based on the feedforward term based on the input current IFC and the feedback term in which the amplitude of the AC component included in the input current IFC as a feedback component. Therefore, the amplitude of the AC signal is not uniformly fixed to the value determined by the feedforward term, and the modification by the feedback term that corresponds to the individual error and the like of the FC-VCU 103 is reflected. In other words, the amplitude of the AC signal is set not only by the feedforward control but also by the feedback control. As a result, the amplitude of the AC signal is set in consideration of the individual error and the like of the FC-VCU 103, and thus, at least one waveform of the electric power output from the fuel cell 101 to be input into the FC-VCU 103 and the electric power output from the FC-VCU 103 is stabilized, and the control stability with respect to the FC-VCU 103 is improved.

Figure 10:
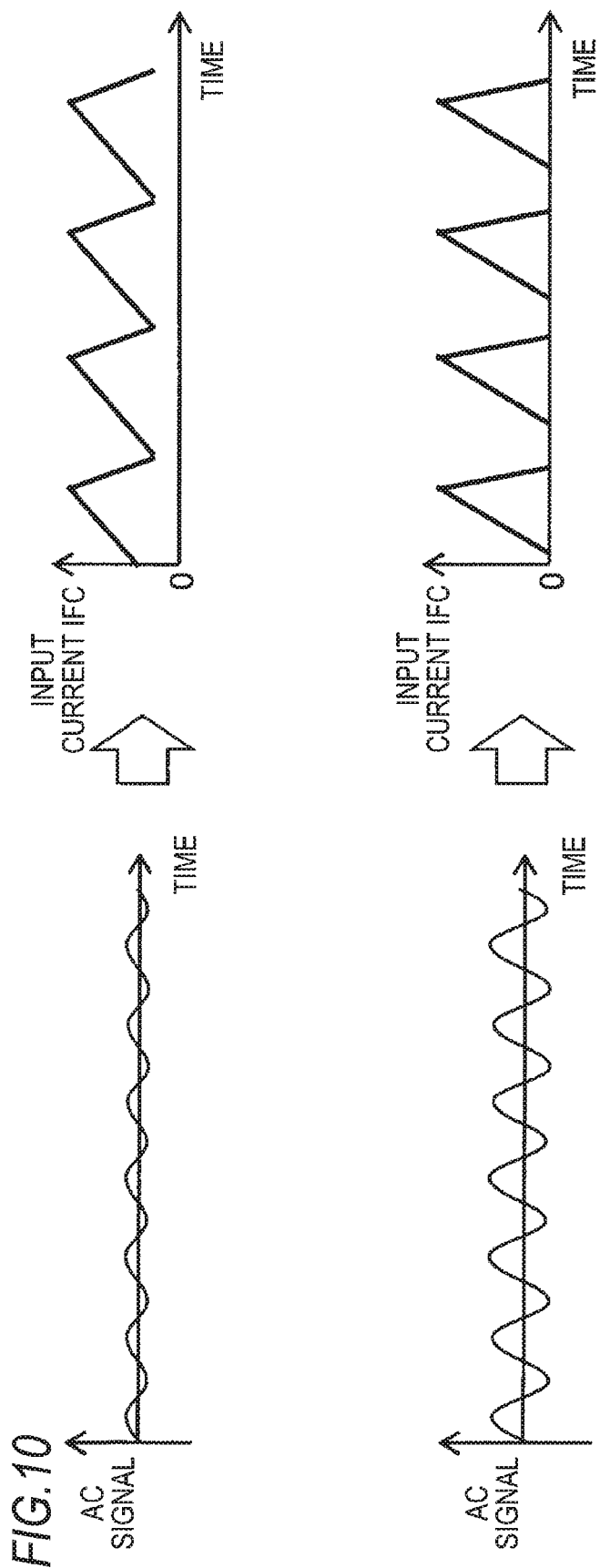
FIG. 10 is an enlarged view illustrating that a value of the input current is in the vicinity of 0 (A), for describing a difference in a waveform of an input current IFC due to a magnitude of an amplitude of an AC signal to be superimposed when driving the FC-VCU with one phase.

In the configuration in which the amplitude of the AC signal is set based on the feedforward term, in particular, when the input current IFC is low, it takes time until the amplitude of the AC signal reaches the target value due to the individual error or the like of the FC-VCU 103 and the amplitude does not converge to a value. Therefore, as illustrated in FIG. 10, since the AC signal is superimposed only by an appropriate value, there is a case where the input current IFC has a discontinuous waveform that intermittently includes (zero-crossing) a period during which the value becomes 0. Such discontinuous waveform input current IFC is not preferable because the input current IFC deteriorates the control stability of FC-VCU 103. However, in the present embodiment, since the amplitude of the AC signal is based on the feedforward term and the feedback term, the amplitude of the AC signal is rapidly set as an appropriate value. As a result, maintaining of the control stability with respect to conversion unit is improved. In addition, the influence on the setting of the amplitude of the AC signal is greater in the feedforward term than in the feedback term. Therefore, the amplitude of the AC signal is mostly determined by the feedforward term, the feedback term merely functions as a correction amount of the feedforward term, and thus, the control stability with respect to the FC-VCU 103 is improved.

Figure 11:
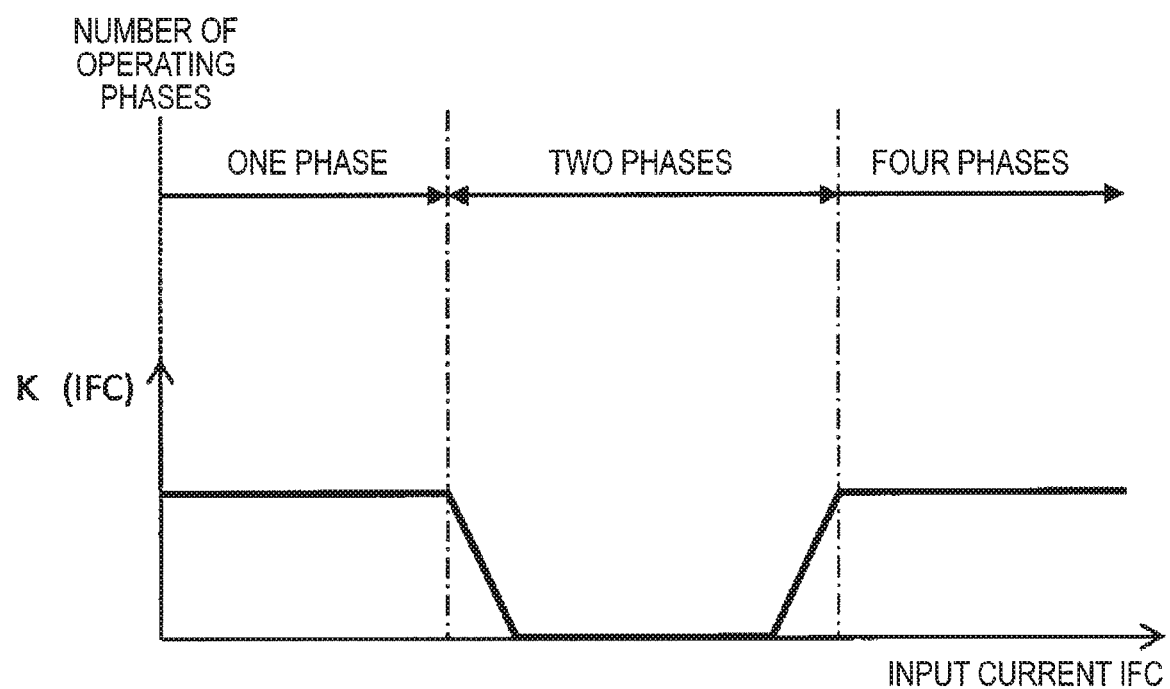
FIG. 11 is a view illustrating an example of a relationship between a coefficient K and the input current of the FC-VCU.

In addition, when the input current IFC is low and when the phase current that flows through each phase (each conversion unit) of the FC-VCU 103 is low, there is a concern of occurrence of the zero crossing or the discontinuous mode due to the AC signal, and thus, there is an effect of setting the amplitude of the AC signal by both of the feedforward term and feedback term, but when the input current IFC or the phase current is high, the zero-crossing or the discontinuous mode is unlikely to occur due to the AC signal. Therefore, only when the input current IFC is low, and only when the input current IFC is high and the phase current is low because the FC-VCU 103 is driven with multiple phases, the feedback term influences the amplitude of the AC signal, and in other cases, the feedback control amount ACripFB calculated by the feedback control unit 135 may be multiplied by the coefficient κ(IFC) illustrated in FIG. 11 such that the feedback term does not influence the amplitude or the influence is reduced. By reducing the coefficient (IFC), it is possible for the AC signal generating unit 123 to reduce the load for executing the feedback term.

Figure 12:
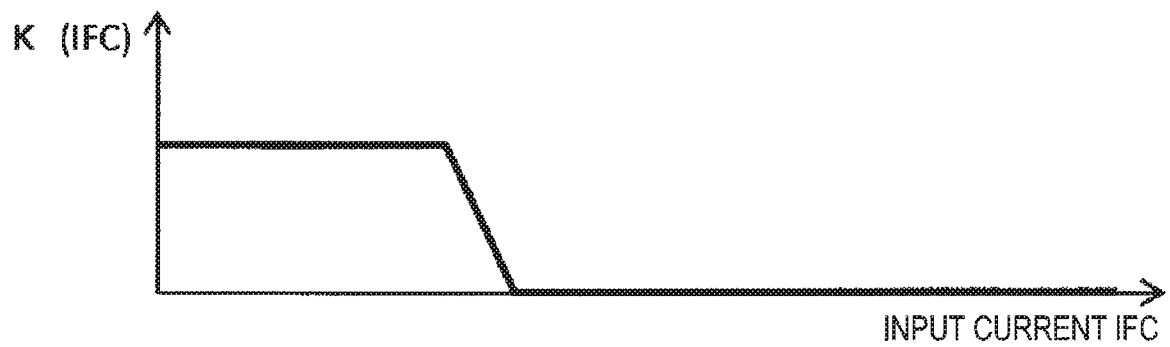
FIG. 12 is a view illustrating another example of the relationship between the coefficient κ and the input current of the FC-VCU.

In addition, when the VCU with a single phase is used instead of the FC-VCU 103, only when the input current IFC is low, the feedback term influences the amplitude of the AC signal, and in other cases, the feedback control amount ACripFB calculated by the feedback control unit 135 may be multiplied by the coefficient κ(IFC) illustrated in FIG. 12 such that the feedback term does not influence the amplitude or the influence is reduced.

Figure 13:
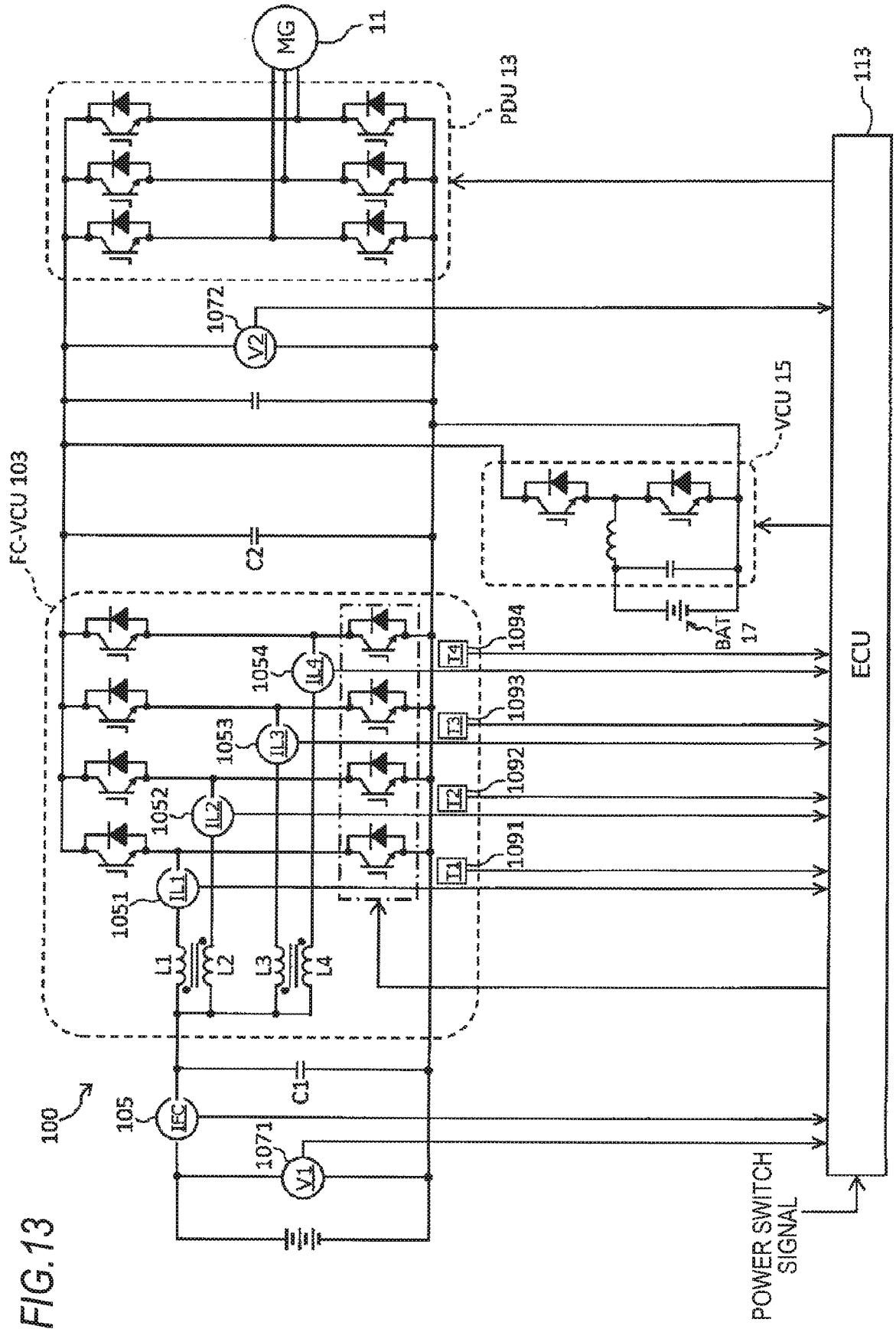
FIG. 13 is a block diagram illustrating a schematic configuration of an electric vehicle in which a power supply device is mounted according to still another embodiment.

In addition, the present invention is not limited to the above-described embodiment, but can be appropriately modified, improved, and the like. For example, although each of the above-described first to eleventh examples has been described independently, a power supply device combining two or more examples may be employed. In addition, although the above-described electric vehicle includes the fuel cell 101 and the battery 17 that serve as an energy source, a secondary battery, such as a lithium ion battery or a nickel hydrogen battery having a higher energy weight density than that of the battery 17 instead of the fuel cell 101. In this case, as illustrated in FIG. 13, in each conversion unit of the FC-VCU 103, a switching element is provided in parallel with the diode connected in series with the reactor, that is, the diode serves as a parasitic diode of the switching element, and the ECU 113 performs the ON and OFF switching operation with respect to two switching elements configured with a high side and a low side, and accordingly, the voltage of the secondary battery provided instead of the fuel cell 101 is boosted and output.

In addition, although the above-described electric vehicle is an one-MOT type electrical vehicle (EV), even in a case of an EV in which a plurality of motor generators are mounted, a hybrid electrical vehicle (HEV) or a plug-in hybrid electrical vehicle (PHEV) in which at least one motor generator is mounted together with an internal combustion engine may be employed. In addition, in the present embodiment, the power supply device 100 is mounted in the electric vehicle, but the power supply device 100 may be provided in electric apparatus that is not intended for transportation. The power supply device 100 is appropriate for a power supply capable of outputting a large current, and is particularly preferable to be applied to a computer in which a large current is remarkable in recent years.

The VCU 15 of the present embodiment boosts the voltage of the battery 17, but when the voltage of the fuel cell 101 is lower than the voltage of the battery 17, a VCU that steps down the voltage of the battery 17 is used. In addition, a VCU capable of bidirectionally boosting and step-down the pressure may be used. Further, the FC-VCU 103 is not limited to the boosting type but may be a step-down type or a boosting and step-down type.

DESCRIPTION OF REFERENCE NUMERALS AND CHARACTERS

11 motor generator (MG)
13 PDU
15 VCU
17 battery
100 power supply device
101 fuel cell (FC)
103 FC-VCU
105 current sensor
1051 to 1054 phase current sensor
1071, 1072 voltage sensor
1091 to 1094 temperature sensor 111 power switch
113 ECU
121 feedback control unit
123 AC signal generating unit
125 switching signal generating unit
131 basic AC setting unit
133 AC amplitude value measuring unit
135 feedback control unit
C1, C2 smoothing capacitor
L1 to L4 reactor
Coa, Cob iron core

The invention claimed is:

1. A power supply device comprising:
a power supply;
a conversion unit configured to perform voltage conversion on electric power to be supplied from the power supply; and
a control unit configured to generate a first control signal for inputting or outputting a target voltage or a target current to and from the conversion unit by a feedback loop, and configured to control the conversion unit based on the first control signal and a second control signal for detecting a state of the power supply, generated outside the feedback loop,
wherein the control unit is configured to set a specific parameter of the second control signal based on a feedforward term based on the output of the power supply, and a feedback term in which the specific parameter, included in at least one of electric power output from the power supply to be input into the conversion unit and electric power output from the conversion unit, is a feedback component.

2. The power supply device according to claim 1, wherein the control unit superimposes the second control signal on the first control signal outside the feedback loop, and outputs a signal based on the first control signal on which the second control signal is superimposed to the conversion unit.

3. The power supply device according to claim 1, wherein the feedforward term has a larger influence on the specific parameter of the second control signal than the feedback term.

4. The power supply device according to claim 1, wherein the control unit modifies the specific parameter derived from the feedforward term according to the specific parameter derived from the feedback term, and generates the second control signal.

5. The power supply device according to claim 1, wherein the control unit executes a feedback control in a control cycle slower than the feedback control for generating the first control signal.

6. The power supply device according to claim 1, wherein the control unit corrects the influence on the specific parameter of the second control signal by the feedback term, based on at least one of a current input into the conversion unit and a current output from the conversion unit.

7. The power supply device according to claim 6, wherein the control unit reduces the influence on the specific parameter of the second control signal by the feedback term, when at least one of the current input into the conversion unit and the current output from the conversion unit is included in a predetermined range.

8. The power supply device according to claim 1, wherein the specific parameter includes an amplitude value of at least one of the current input into the conversion unit and the current output from the conversion unit.

9. The power supply device according to claim 1, wherein the control unit measures impedance of the power supply based on the output of the power supply generated by the second control signal.

10. The power supply device according to claim 9, wherein:
the power supply is a fuel cell; and
the control unit adjusts a humidifying amount in the fuel cell based on the impedance.

11. An apparatus comprising:
the power supply device according to claim 1.

12. A power supply device comprising:
a power supply;
a conversion unit formed by electrically connecting a plurality of conversion units in parallel, the plurality of conversion units configured to perform voltage conversion on electric power to be supplied from the power supply;
a change unit configured to change the number of operations which is the number of the conversion units performing the voltage conversion; and
a control unit configured to generate a first control signal for inputting or outputting a target voltage or a target current to and from the conversion unit by a feedback loop, and configured to control the conversion unit based on the first control signal and a second control signal for detecting a state of the power supply, generated outside the feedback loop,
wherein the control unit is configured to set a specific parameter of the second control signal based on a feedforward term based on at least one of the number of operations and a current output from the power supply to be input into the conversion unit and a feedback term in which the specific parameter, included in at least one of electric power output from the power supply to be input into the conversion unit and electric power output from the conversion unit, is a feedback component.

13. An apparatus comprising:
the power supply device according to claim 12.

14. A control method performed by a power supply device,
the power supply device including:
a power supply;
a conversion unit configured to perform voltage conversion on electric power to be supplied from the power supply; and
a control unit configured to generate a first control signal for inputting or outputting a target voltage or a target current to and from the conversion unit by a feedback loop, and configured to control the conversion unit based on the first control signal and a second control signal for detecting a state of the power supply, generated outside the feedback loop,
the control method comprising
setting a specific parameter of the second control signal, by the control unit, based on a feedforward term based on the output of the power supply and a feedback term in which the specific parameter, included in at least one of electric power output from the power supply to be input into the conversion unit and electric power output from the conversion unit, is a feedback component by the control unit.

15. A control method performed by a power supply device, the power supply device including:
a power supply;
a conversion unit formed by electrically connecting a plurality of conversion units in parallel, the plurality of conversion units configured to perform voltage conversion on electric power to be supplied from the power supply;

a change unit configured to change the number of operations which is the number of the conversion units performing the voltage conversion; and a control unit configured to generate a first control signal for inputting or outputting a target voltage or a target current to and from the conversion unit by a feedback loop, and configured to control the conversion unit based on the first control signal and a second control signal for detecting a state of the power supply, generated outside the feedback loop, the control method comprising setting a specific parameter of the second control signal, by the control unit, based on a feedforward term based on at least one of the number of operations and a current output from the power supply to be input into the conversion unit and a feedback term in which the specific parameter, included in at least one of electric power output from the power supply to be input into the conversion unit and electric power output from the conversion unit, is a feedback component.

* * * * *